United States Patent [19]

Wang

[11] Patent Number: 5,496,242
[45] Date of Patent: Mar. 5, 1996

[54] PULL-UP EXERCISING MACHINE WITH SAFETY AIR BUFFER

[75] Inventor: Leao Wang, Taichung Hsien, Taiwan

[73] Assignee: Greenmaster Industrial Corp., Toupien Tsun Taiping Hsiang, Taiwan

[21] Appl. No.: 183,766

[22] Filed: Jan. 21, 1994

[51] Int. Cl.[6] .................................. A63B 23/12
[52] U.S. Cl. .................. 482/97; 482/112; 482/137; 482/38
[58] Field of Search .................. 482/26, 38–42, 482/51, 94–103, 112, 113; 267/64, 26, 64, 28; 188/286, 301, 318

[56] References Cited

U.S. PATENT DOCUMENTS

| | | | |
|---|---|---|---|
| 3,944,198 | 3/1976 | Sakamoto | 267/64.26 |
| 3,944,221 | 3/1976 | Berkestad et al. | 482/112 |
| 3,970,292 | 7/1976 | Dachicourt et al. | 188/286 |
| 4,846,458 | 7/1989 | Potts . | |
| 4,899,853 | 2/1990 | Hummel | 188/318 |
| 5,322,489 | 6/1994 | Webb et al. | 482/38 |
| 5,372,556 | 12/1994 | Ropp | 482/41 |
| 5,407,404 | 4/1995 | Killian et al. | 482/38 |

OTHER PUBLICATIONS

Universal Exercise Equipment 1980–1981 Catalog p. 9.

*Primary Examiner*—Richard J. Apley
*Assistant Examiner*—John Mulcahy
*Attorney, Agent, or Firm*—Bacon & Thomas

[57] ABSTRACT

A pull-up exercising machine including two opposite handlebars fastened to an upright frame above a base frame, a revolving axle transversely fastened to the upright frame and spaced between handlebars and the base frame, a first supporting rod perpendicularly connected to the revolving axle in the middle, a second supporting rod perpendicularly connected to the revolving axle at one end, a platform hinged to the first supporting rod, a weight holder mounted on the second supporting rod to hold weights, two connecting rods bilaterally connected between the platform and the upright frame to maintain the platform horizontal, and a retracting air cylinder connected between the second supporting rod and the base frame, for buffering the upstroke of the platform to a speed that is safe for the user.

3 Claims, 3 Drawing Sheets

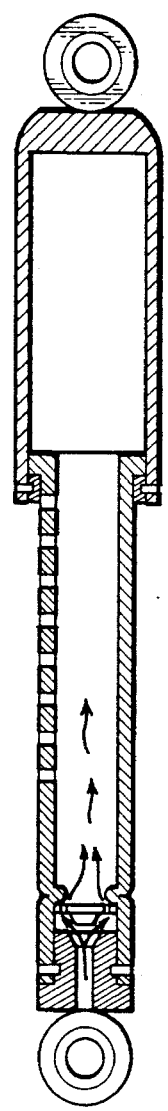
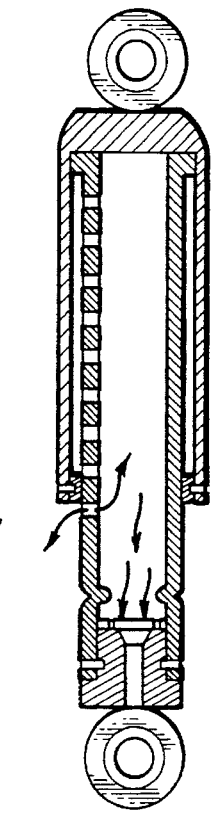
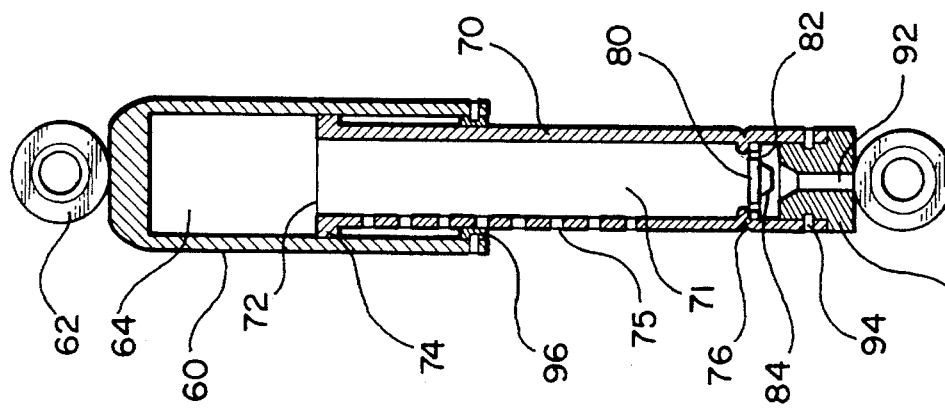

PULL-UP EXERCISING MACHINE WITH SAFETY AIR BUFFER

BACKGROUND OF THE INVENTION

The present invention relates to an exercising machine for performing the act of chinning oneself which is simple in structure and inexpensive to manufacture.

A variety of exercising machines have been disclosed for exercising different parts of the body, and have appeared on the market. There is an exercising machine specifically designed for performing the act of thinning oneself. This pull-up exercising machine, as shown in FIG. 1, is generally comprised of a base frame 10, an upright back frame 11, a bevel front frame 12, a horizontal top frame 13, two hand grips 21 bilaterally extended downwards from the horizontal top frame 13, two handrails 22 bilaterally connected to the bevel front frame 12 in the middle and disposed in horizontal, a supporting arm 14 having a rear end pivotably fastened to the upright back frame 11 by a pivot 20 and a front end attached with a platform 19, a foot stool 18 mounted on the base frame 10, and a pull rope 16 having one end fastened to the bevel front frame 12 and an opposite end passing through a plurality of pulleys 17 to carry weights 15. When the user stands on the platform 19, the supporting arm 14 is forced to turn downwards causing the weights 15 to be lifted. When the player pulls the body up, the supporting arm 14 is lifted to its former horizontal position by the pressure of the weights 15. Because this structure of pull-up exercising machine is bulky, heavy, and expensive, it is still not popularly accepted. Another drawback of this structure of pull-up exercising machine is that the platform 19 will be turned to a sloping position when the supporting arm 14 is lowered, and therefore the user may slip from the platform 19.

U.S. Pat. No. 4,846,458 discloses a similar apparatus for performing the act of chinning oneself, which uses two sets of four-bar linkages to keep the platform constantly maintained in a horizontal position, and an adjustable hydraulic cylinder serves to stabilize the movement of the platform. This structure of exercising machine is very expensive and difficult to maintain, and therefore its market is limited only to gymnastics centers and professional clubs.

SUMMARY OF THE INVENTION

The present invention has been accomplished in view of the aforesaid circumstances. It is therefore one object of the present invention to provide a pull-up exercising machine which is simple in structure. It is another object of the present invention to provide a pull-up exercising machine which is inexpensive to manufacture. It is still another object of the present invention to provide a pull-up exercising machine which is easy to maintain. It is still another object of the present invention to provide a pull-up exercising machine which is safe in use. According to the preferred embodiment of the present invention, the pull-up exercising machine comprises two opposite handlebars fastened to an upright frame above a base frame, a revolving axle is transversely fastened to the upright frame and spaced between the handlebars and the base frame, a first supporting rod is perpendicularly connected to the revolving axle in the middle thereof, a second supporting rod is perpendicularly connected to the revolving axle at one end thereof, a platform is hinged to the first supporting rod, a weight holder is mounted on the second supporting rod to hold weights;, two connecting rods are bilaterally connected between the platform and the upright frame to maintain the platform in a horizontal position, and a retracting air cylinder is connected between the second supporting rod and the base frame. When the player sits on the platform, the revolving axle is turned,on its own axis, causing the second supporting rod lifted. When the user raises the body up from the platform, the revolving axle is turned in the reversed direction by the gravity of the weights on the weight holder, thus causing the platform to be lifted, and the retracting cylinder retracts and buffers the down stroke of the second supporting rod.

BRIEF DESCRIPTION OF THE DRAWINGS

FIG. 5 is a longitudinal view in section of the retracting air cylinder shown in FIG. 4;

FIG. 6 is similar to FIG. 5 but showing the retracting air cylinder extended out; and FIG. 7 is similar to FIG. 5 but showing the retracting air cylinder retracted.

DETAILED DESCRIPTION OF THE PREFERRED EMBODIMENT

Figure 2:
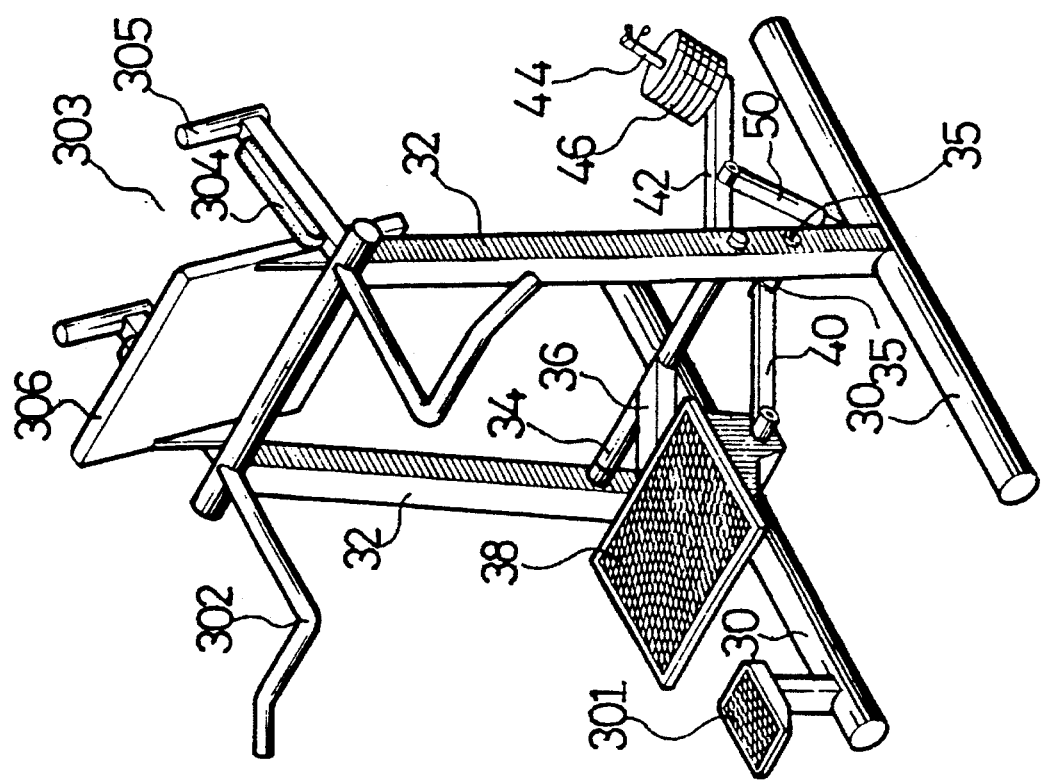
FIG. 2 is a perspective view of a pull-up exercising machine according to the preferred embodiment of the present invention.
Figure 3:
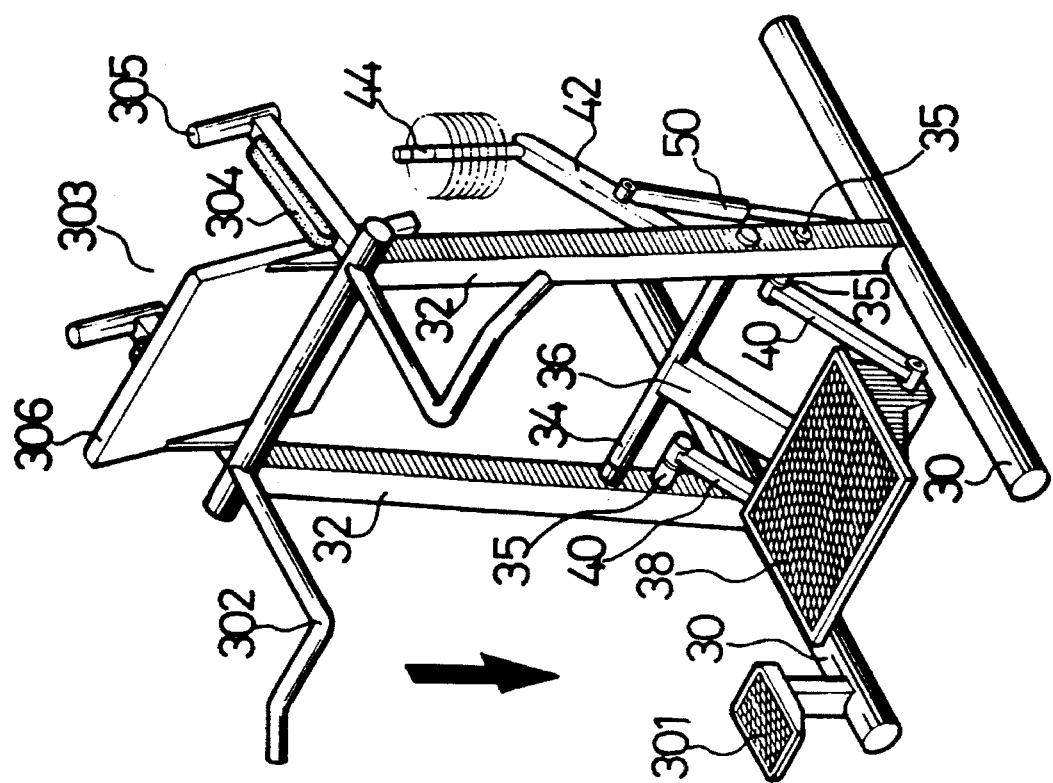
FIG. 3 is similar to FIG. 2 but showing the weight being lifted.

Referring to FIGS. 2 and 3, an upright frame, including a pair of vertical spaced legs 32, which is made of a substantially trapezoidal shape are fastened to two parallel bottom rods 30 in the middle. There are two handlebars 302 bilaterally fastened to the upright frame at the top thereof, a revolving axle 34 is transversely fastened between the legs 32 at a lower elevation above the parallel bottom rods 30. There is a first supporting rod 36 and a second supporting rod 42 respectively and perpendicularly extending from the axle 34 in reversed directions. The first supporting rod 36 is connected to the axle 34 in the middle thereof, and has an opposite end hinged to a platform 38. The second supporting rod 42 is connected to one end of the axle 34, and has an opposite end terminating in a weight holder 44 to hold weights 46. There are two horizontal stub rods 35 fastened to the legs 32 at two opposite sides and horizontally aligned between the axle 34 and the parallel bottom rods 30. There are two connecting rods 40, each having one end pivotally connected to the platform 38 at either side and an opposite end pivotally connected to either stub rod 35. Therefore, when the platform 38 is moved downwards under pressure, the revolving axle 34 is turned on its own axis, thus causing the weight holder 44 with the weights 46 to be lifted. When the platform 38 is released, the revolving axle 34 is turned in the reversed direction by the weights 46, thus causing the platform to be lifted. In order to buffer or gradually resist the down stroke of the weights 46, a retractable cylinder 50 is fastened between the second supporting rod 42 and the adjacent bottom rod 30.

Figure 1:
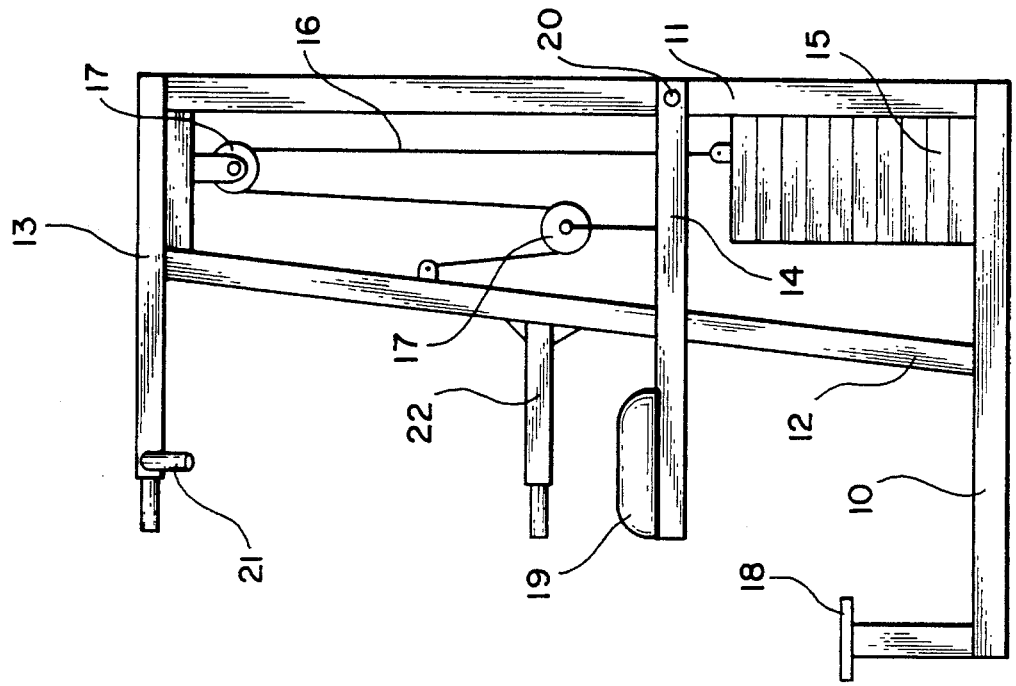
FIG. 1 is a side elevational view of a pull-up exercising machine according to the prior art.
Figure 4:
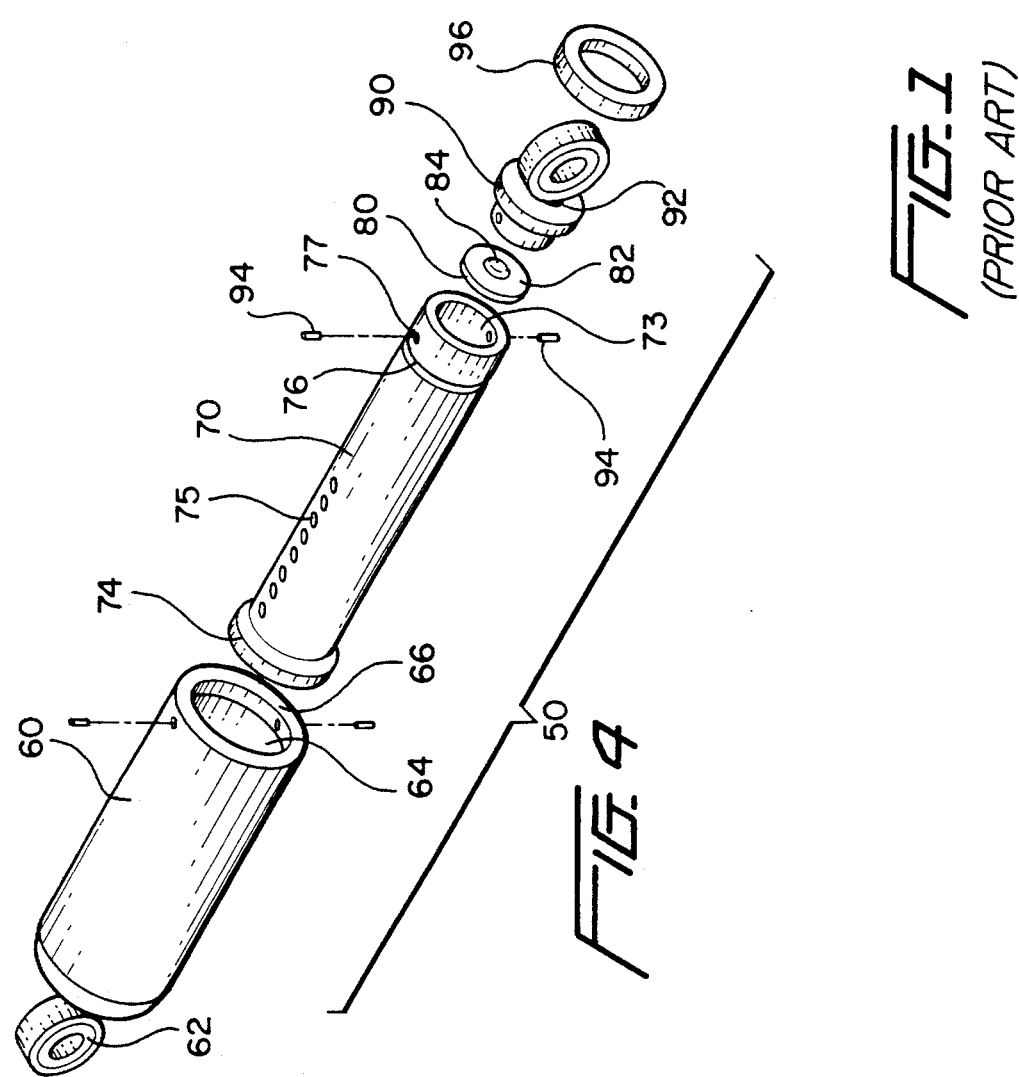
FIG. 4 is an exploded perspective view of an air cylinder according to the present invention.

Referring to FIGS. 4 and 5, the retractable cylinder 50 comprises a cylindrical casing 60, an inner tube 70, a movable blocking plate 80, a plug cap 90, and a locating ring 96. The cylindrical casing 60 comprises a mounting ring 62 at one end fastened to the second supporting rod 42 in the middle thereof and an inside annular groove 66 at the open end of an inside chamber 64 thereof. The inner tube 70 is inserted into the cylindrical casing 60, and includes an outside flange 74 around a first open end 72 thereof, a series of air holes 75 aligned in the longitudinal direction, an annular inward projection 76 made through a ramming process and projecting into a second open end 73 thereof, and opposite screw holes 77 through the second open end 73 in the radial direction. The movable blocking plate 80 is inserted into the inside chamber 71 of the inner tube 70 and stopped at the inward projection 76, having a raised portion 84 on an outer side thereof in the center and an air hole 82. The plug cap 90 fits into the second open end 73 and is fixed to the screw holes 77 on the inner tube 70 by screws 94, and includes a countersunk air hole 92. The opposite end of the plug cap 90 is fastened to one bottom rod 30. The locating ring 96 is fixed at the inside annular groove 66 to limit the forward stroke of the inner tube 70.

Referring to FIGS. 6 and 7 and FIGS. 2 and 3 again, when the second supporting rod 42 is lifted to pull the retracting air cylinder 50, the cylindrical casing 60 is moved outwards from the inner tube 70. When the inner tube 70 is extended out, the movable blocking plate 80 is pushed by air pressure to stop at the inward projection 76, thus permitting outside air to pass through the countersunk air hole 92 on the plug cap 90 and into the retracting air cylinder 50 via the air hole 82 on the movable blocking plate 80. Therefore, the retracting air cylinder 50 is smoothly extended out to the full length (see FIG. 6). When the retracting air cylinder 50 is extended out to the full length, the platform 38 is lowered to its lower limit, and the outside flange 74 of the inner tube 70 is stopped at the locating ring 96 so that the cylindrical casing 60 does not disconnect from the inner tube 70. When the second supporting rod 42 is lowered to retract the retracting air cylinder 50, the movable blocking plate 80 is forced by air pressure to block up the countersunk air hole 92 by the raised portion 84 thereof, causing inside air to be exhausted through the air holes 75. When the cylindrical casing 60 is moving downwardly, the air holes 75 are gradually and sequentially blocked, and therefore the down stroke of the second supporting rod 42 is buffered.

When in use, the user may sit on the platform 38 with both hands holding on the handlebars 302 to raise the body up by bending the arms. There is also provided a footstool 301 affixed to one bottom rod 30 for helping the user perform the act of chinning. The total weight of the weights 46 may be adjusted according to the physical condition of the user.

Referring to FIGS. 2 and 3 again, the upright frame 32 further comprises a back rest 306 at the top, two opposite handrails 304 symmetrically disposed opposite to the handlebars 302 and separated by a spacing 303. The handrails 304 each terminate in a respective hand grip 305. The user may stand in the spacing 303 to manually grip the hand grips 305, with the elbows and the back respectively engaging the handrails 304 and the back rest 306, so as to exercise the legs by raising them from the ground.

What is claimed is:

1. A pull-up exercising machine comprising:
   a) a base frame;
   b) an upright frame including a pair of spaced vertical legs supported on and extending upwardly from the base frame;
   c) a rotatable axle transversely mounted to the upright frame between the vertical legs;
   d) a first supporting rod extending perpendicularly from the middle of the axle and a second supporting rod extending perpendicularly from an end of the axle, the first and second supporting rods extending in substantially opposite directions from the axle;
   e) a platform hinged to the first supporting rod and a weight holder mounted on the second supporting rod;
   f) a pair of connecting arms including a first pair of ends pivotally connected to the platform and a second pair of ends pivotally connected to the vertical legs of the upright frame for maintaining the platform in a constant horizontal position;
   g) whereby downward pressure applied to the platform by a user causes a corresponding rotation of the axle about its axis in a first direction to lift the weight holder, and when pressure is released from the platform by the user, the axle is caused to rotate about its axis in a reverse direction to lower the weight holder; and
   h) a retracting air cylinder mounted between the second supporting arm and the base frame for gradually resisting the lowering of the weight holder when pressure is released from the platform by the user, wherein the retracting air cylinder includes:
      i) a hollow cylindrical casing including a closed first end secured to the second supporting arm at the middle thereof, an open second end, an internal annular groove at the second end, and a locating ring disposed within the annular groove;
      ii) a hollow inner tube slidably received within the casing for retraction therein and extension therefrom, the tube including a first end disposed within the casing, an exterior annular flange at the first end for engaging the locating ring to limit the extension of the tube from the casing, a plurality of air holes longitudinally spaced along the tube, an open second end, a movable blocking plate disposed within the second end, the blocking plate including an air hole therethrough, an annular inwardly directed projection at the second end for limiting the inward movement of the blocking plate, a plug cap secured to the second end and having an air hole therethrough, and the second end being connected to the base frame; and
      iii) wherein, when the weight holder is raised, the tube extends from the casing and causes the blocking plate to engage the annular projection for permitting outside air to pass through the air holes of the plug cap and blocking plate and into the inner tube, and when the weight holder is lowered, the blocking plate is moved against the plug cap for blocking the air holes of the blocking plate and the plug cap, thereby permitting air from the inner tube to be exhausted through the longitudinally spaced holes, for resisting the downward movement of the weight holder.

2. The exercising machine of claim 1 further including handle means mounted on the upright frame for grasping by the user during application of pressure to and release of pressure from the platform.

3. The exercising machine of claim 1 further including:
   a) a backrest mounted to the upright frame; and
   b) a pair of spaced hand rails extending outwardly from the backrest, with each hand rail terminating in a hand grip.

* * * * *